US008024460B2

(12) United States Patent
Hisatomi et al.

(10) Patent No.: US 8,024,460 B2
(45) Date of Patent: Sep. 20, 2011

(54) PERFORMANCE MANAGEMENT SYSTEM, INFORMATION PROCESSING SYSTEM, AND INFORMATION COLLECTING METHOD IN PERFORMANCE MANAGEMENT SYSTEM

(75) Inventors: Tatsuya Hisatomi, Yokohama (JP); Hideo Ohata, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 178 days.

(21) Appl. No.: 12/364,837

(22) Filed: Feb. 3, 2009

(65) Prior Publication Data

US 2010/0146103 A1    Jun. 10, 2010

(30) Foreign Application Priority Data

Dec. 8, 2008    (JP) .................................. 2008-312625

(51) Int. Cl.
*G06F 13/00*    (2006.01)
(52) U.S. Cl. ......................... 709/224; 709/214; 709/226
(58) Field of Classification Search .................. 709/223, 709/224, 225, 230, 232, 233
See application file for complete search history.

(56) References Cited

U.S. PATENT DOCUMENTS

| 6,792,393 | B1 * | 9/2004 | Farel et al. .................... 702/186 |
| 7,421,511 | B2 * | 9/2008 | Shiga et al. ................... 709/235 |
| 2007/0226535 | A1 * | 9/2007 | Gokhale .......................... 714/6 |
| 2009/0296577 | A1 * | 12/2009 | Gusat et al. ............... 370/230.1 |

FOREIGN PATENT DOCUMENTS

| JP | 2004-236030 | 8/2004 |
| JP | 2007047986 | 2/2007 |

* cited by examiner

*Primary Examiner* — Viet Vu
(74) *Attorney, Agent, or Firm* — Brundidge & Stanger, P.C.

(57) ABSTRACT

Provided is a performance management system 10 collecting management information which is used for performance management of a storage system 5 including a server 2 on which applications operate, a storage apparatus 3, and a switch 4 which couples the server 2 with the storage apparatus 3. The performance management system collects the management information from multiple resources existing on input-output paths that couple the respective applications with the storage, sets a method of collecting the management information from the resources, monitors occurrence of congestion which is attributable to input-output between the performance management system and the resources for collecting the management information, and collects the management information in accordance with the set collecting method. The collecting method is set in accordance with a processing method of using different timings to collect the management information for the respective input-output paths.

9 Claims, 12 Drawing Sheets

PERFORMANCE INFORMATION TABLE 500

| DATE AND TIME OF ACQUISITION | RESOURCE NAME | METRICS VALUE |
|---|---|---|
| 2006/06/06 13:00 | FILE A | 1214.5 |
| 2006/06/06 13:00 | FILE D | 1248.5 |
| 2006/06/06 13:00 | FILE F | 1232.5 |
| 2006/06/06 13:00 | VOLUME C | 2200.5 |
| 2006/06/06 13:00 | PORT B | 1237.5 |
| 2006/06/06 13:00 | PORT F | 1236.5 |
| 2006/06/06 13:00 | PORT G | 1224.3 |
| 2006/06/06 13:00 | PORT K | 1212.3 |
| 2006/06/06 13:00 | PORT N | 1452.3 |
| 2006/06/06 13:00 | PORT P | 1100.2 |
| 2006/06/06 13:00 | LDEV_A | 1425.3 |
| 2006/06/06 13:00 | RAID GROUP B | 2238.9 |
| ... | ... | ... |
| 2006/06/06 18:00 | FILE A | 1214.5 |
| 2006/06/06 18:00 | FILE D | 1248.5 |
| 2006/06/06 18:00 | FILE F | 1232.5 |
| 2006/06/06 18:00 | VOLUME C | 2200.5 |
| 2006/06/06 18:00 | PORT B | 1237.5 |
| 2006/06/06 18:00 | PORT F | 1236.5 |
| 2006/06/06 18:00 | PORT G | 1224.3 |
| 2006/06/06 18:00 | PORT K | 1212.3 |
| 2006/06/06 18:00 | PORT N | 1452.3 |
| 2006/06/06 18:00 | PORT P | 1100.2 |
| 2006/06/06 18:00 | LDEV_A | 1425.3 |
| 2006/06/06 18:00 | RAID GROUP B | 2238.9 |
| ... | ... | ... |

FIG. 5

COLLECTION TIME ADJUSTMENT VALUE
FOR MANAGEMENT INFORMATION

| I/O PATH | TIME ADJUSTMENT VALUE |
|---|---|
| I/O PATH A | +10 SECONDS |
| I/O PATH B | +60 SECONDS |
| I/O PATH C | +120 SECONDS |

FIG. 6

COLLECTION TIME ADJUSTMENT VALUE
FOR MANAGEMENT INFORMATION

| I/O PATH | TIME ADJUSTMENT VALUE |
|---|---|
| I/O PATH A | +60 SECONDS |
| I/O PATH B | +10 SECONDS |

FIG. 7

COLLECTION TIME ADJUSTMENT VALUE
FOR MANAGEMENT INFORMATION

| I/O PATH | TIME ADJUSTMENT VALUE |
|---|---|
| I/O PATH A | +60 SECONDS |
| I/O PATH B | +60 SECONDS |
| I/O PATH C | +120 SECONDS |

FIG. 8

COLLECTION TIME ADJUSTMENT VALUE
FOR MANAGEMENT INFORMATION

| I/O PATH | TIME ADJUSTMENT VALUE |
|---|---|
| I/O PATH A | +120 SECONDS |
| I/O PATH B | +10 SECONDS |
| I/O PATH C | +60 SECONDS |

FIG. 9

PERFORMANCE MANAGEMENT SYSTEM, INFORMATION PROCESSING SYSTEM, AND INFORMATION COLLECTING METHOD IN PERFORMANCE MANAGEMENT SYSTEM

CROSS-REFERENCE TO RELATED APPLICATION

The present application claims priority from Japanese Patent Application No. 2008-312625 filed on Dec. 8, 2008, which is herein incorporated by reference.

BACKGROUND OF THE INVENTION

1. Field of the Invention

The present invention relates to a performance management system, an information processing system, and an information collecting method in the performance management system. More specifically, the present invention relates to a technique for preventing congestion that may occur in a management server when the management server collects management information on an information processing system from multiple agents.

2. Related Art

In general, in performance management of a system such as a storage system provided with various resources, agents are provided for the respective resources such as a management target apparatus and software that operates on the management target apparatus; and a management apparatus (a manager) acquires information (management information) on configurations or performances of the resources from these agents, and figures out the system conditions based on the acquired management information to perform appropriate control.

For example, Japanese Patent Application Laid-open Publication No. 2004-236030 discloses that a management server (a manager) collects management information from agents implemented in management target apparatuses by using techniques including SNMP (simple network management protocol)/MIB (management information base)/RMON (remote network monitoring), and thereby performs actions such as display of a configuration diagram, determination of a point of failure, display of events issued from the management target apparatuses, real-time monitoring of an operating state of the management target apparatuses, traffic overloads and the like, display of a graph, and monitoring of states of traffic loads and packet losses by comparison with thresholds or by other operations.

Management of loads on the management server is a key issue when the management server is configured to collect management information from multiple agents as described above. Specifically, since transmission of the management information from an agent to the management server can take place at any timing, simultaneous and intensive transmission of the management information from multiple agents may cause input/output congestion, and this may result in a processing delay, a management information loss and other failures in the management server.

SUMMARY OF THE INVENTION

The present invention has been made in view of these problems. An object of the present invention is to provide a performance management system, an information processing system, and an information collecting method in the performance management system, which are capable of preventing congestion in a management server when the management server collects management information on an information processing system from multiple agents.

To attain the object, one aspect of the present invention provides a performance management system for a storage system including a server on which applications operate, a storage apparatus for managing data, which is to be accessed by the server, in a storage, and a switch for communicatively coupling the server with the storage apparatus, the performance management system being communicatively coupled with the server, the storage apparatus and the switch, and collecting management information used for performance management of the storage system, the performance management system comprising an information collecting part which collects the management information from a plurality of resources existing on input-output paths that couple the respective applications with the storage, a collecting method setting part which sets a method of causing the information collecting part to collect the management information from each of the resources; a congestion monitor which monitors whether or not congestion occurs due to input-output between the performance management system and the resources for collecting the management information, and a collecting process controller which controls the information collecting part so that the management information is collected in accordance with the method set by the collecting method setting part, wherein the collecting method setting part sets the collecting method in accordance with a first processing method of using different timings to collect the management information for the respective input-output paths.

According to this aspect of the present invention, the timings to collect the management information are set different from each other. Therefore, it is possible to reduce loads of collection at a certain time point and thereby to reduce or eliminate congestion.

Meanwhile, another aspect of the present invention provides the performance management system in which the collecting method setting part sets the collecting method in accordance with any one of the first processing method and a second processing method in which the different timings are used to collect the management information for the respective input-output paths, and if any of the resources is shared by different input-output paths, the timing of collecting the management information of any one of the input-output paths using the shared resource is also used to collect the management information of the other input-output paths using the shared resource.

According to this aspect of the present invention, at the time of collecting the management information of resources used by a first application, the management information of resources used by a second application that uses the shared resource is also collected. Therefore, in such a case where the inputs and outputs for acquiring the management information from the shared resource is a cause of congestion, it is possible to grasp an influence by the second application at the same time and thereby to grasp the cause of the congestion in detail.

Meanwhile, another aspect of the present invention provides the performance management system in which the collecting method setting part sets the collecting method in accordance with any one of the first processing method, the second processing method, and a third processing method of using different timings to collect the management information for respective groups of the applications using the shared resource.

According to this aspect of the present invention, the management information of the group of applications using the shared resource is collected at the same timing. Therefore, when the inputs and outputs for acquiring the management information from the shared resource is the cause of congestion, it is possible to grasp an influence by the other applications that belong to the same group and thereby to grasp the cause of the congestion in detail.

Meanwhile, another aspect of the present invention provides the performance management system in which the collecting method setting part sets the collecting method in accordance with any one of the first processing method, the second processing method, the third processing method, and a fourth processing method of using a timing to collect the management information for one of the input-output paths of the applications using a larger number of the resources later than the timings to collect the management information for the other input-output paths of the applications.

In general, the more the number of resources is, the larger the amount of the management information becomes. According to this aspect of the present invention, by setting later timing of collecting the management information for the application using more resources, it is possible to efficiently reduce or eliminate congestion occurring at the present time.

Other problems and their solutions to be disclosed in this application will be clarified in the chapter of Detailed Description of the Invention and the accompanying Drawings.

According to the present invention, it is possible to prevent congestion in a management server when the management server collects management information of an information processing system from multiple agents.

BRIEF DESCRIPTION OF THE DRAWINGS

FIG. 5 is a table showing an example of a performance information table 500;

FIG. 6 is a table showing an example of adjustment of collection timing to be set in accordance with a first processing method;

FIG. 7 is a table showing an example of adjustment of collection timing to be set in accordance with a second processing method;

FIG. 8 is a table showing an example of adjustment of collection timing to be set in accordance with a third processing method;

FIG. 9 is a table showing an example of adjustment of collection timing to be set in accordance with a fourth processing method;

DETAILED DESCRIPTION OF THE INVENTION

Now, an embodiment of the present invention will be described below in detail with reference to the accompanying drawings.

Figure 1A:
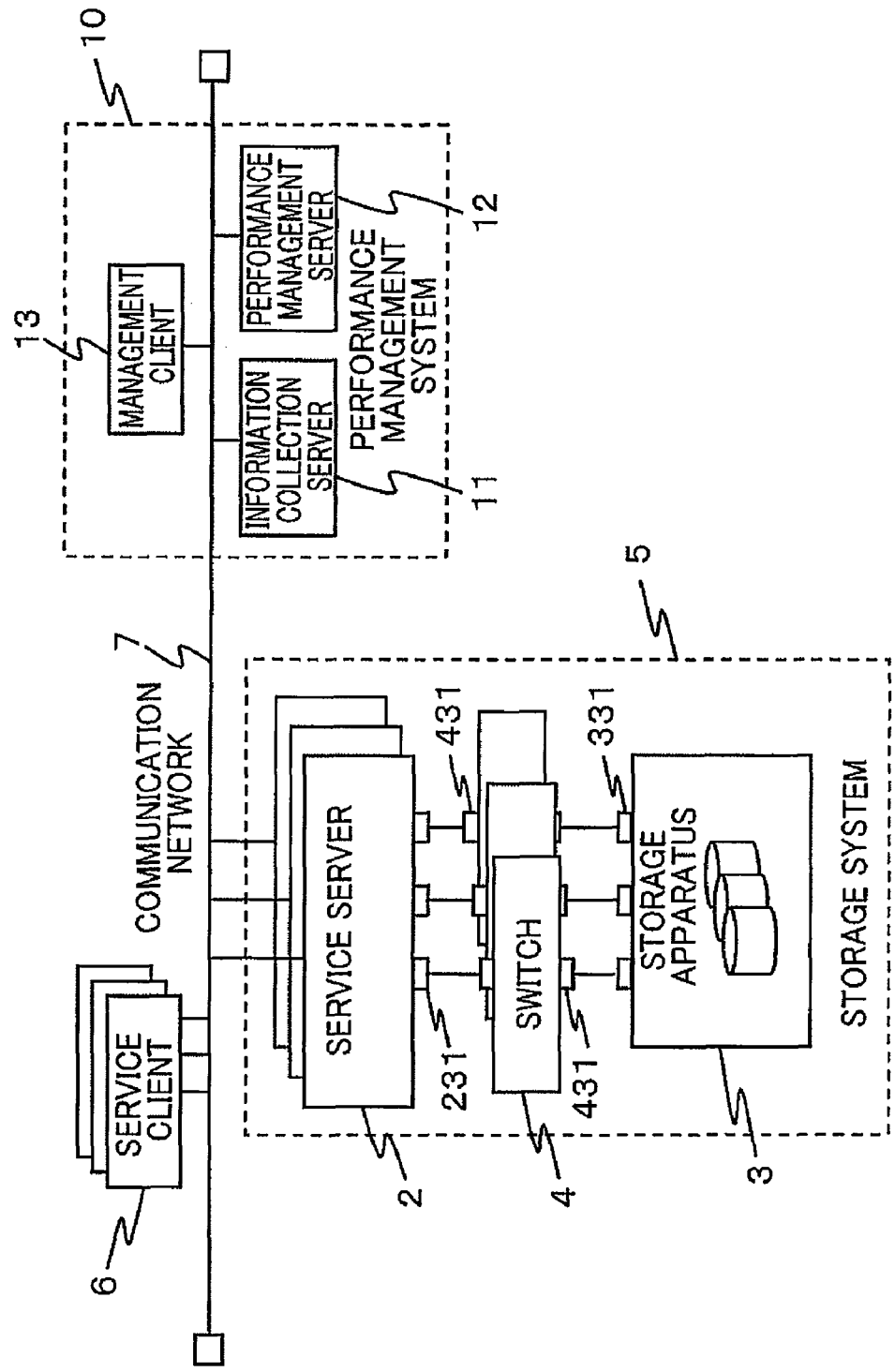
FIG. 1A is a diagram showing a configuration of an information processing system 1 to be described as a first embodiment of the present invention.

FIG. 1A shows a configuration of an information processing system 1 which is described as one embodiment of the present invention. As shown in FIG. 1A, this information processing system 1 includes at least one service server 2, at least one storage apparatus 3, at least one switch 4, at least one service client 6, an information collection server 11, a performance management server 12, and a management client 13.

The service client 6 and the service server 2 are communicatively coupled with each other through a communication network 7. The communication network 7 is, for example, a local area network (LAN), a wide area network (WAN), the Internet, a public communication network or a lease line.

The service server 2 and the storage apparatus 3 are communicatively coupled with each other through the switch 4. The service server 2, the storage apparatus 3, and the switch 4 form a storage system 5 for managing data to be used by the service client 6.

The service server 2 includes at least one communication port 231. The storage apparatus 3 includes at least one communication port 331. The switch 4 includes at least one communication port 431 to be coupled with the communication port 231 of the service server 2 or with the communication port 331 of the storage apparatus 3.

The switch 4 is, for example, a LAN switch (such as a switching hub in compliance with the 10BASE-T, the 100BASE-T or the 1000BASE-T(TX)), or a fibre channel switch used for configuring a storage area network (SAN).

An operating system and applications (including service applications, system management software, database management applications, and the like) are operated on the service server 2. When a data I/O request is generated in the operating system or the applications, the service server 2 issues (transmits) an I/O command (such as a data write command or a data read command) to the storage apparatus 3. Upon receipt of the I/O command, the storage apparatus 3 executes control in response to the I/O command over a storage medium such as a hard disk device and transmits a result thereof (notification of data write completion or notification of data read completion) or data (data read out from the storage medium) to the service server 2.

The information collection server 11, the performance management server 12, and the management client 13 are all coupled with the connection network 7 so as to communicate with one another. The information collection server 11, the performance management server 12, and the management client 13 form a performance management system 10 to perform performance management of the storage system 5.

The information collection server 11 and the performance management server 12 can communicate with the service server 2, the storage apparatus 3, and the switch 4 through the communication network 7. Note that the information collection server 11 and the performance management server 12 may be communicatively coupled with the service server 2, the storage apparatus 3 and the switch 4 through communication means (such as a communication network provided for management) different from the communication network 7.

The information collection server 11 collects information on a configuration of each of the service server 2, the storage apparatus 3 and the switch 4 (such information will be hereinafter referred to as configuration information) and information on a performance of each of them (such information will be hereinafter referred to as performance information), and then provides the configuration information and the performance information thus collected to the performance management server 12 as appropriate. A database management system (DBMS) for managing the configuration information and the performance information is operated on the information collection server 11.

The performance management server 12 monitors and controls the storage system 5 (the service server 2, the storage apparatus 3, and the switch 4) on the basis of the configuration information and the performance information provided by the information collection server 11. A database management system (DBMS) for managing the configuration information and the performance information provided by the information collection server 11 is operated on the performance management server 12.

The management client 13 includes a character user interface (CUI) or a graphical user interface (GUI). The management client 13 provides a user interface for the monitoring and control of the storage system 5 to be carried out by using the information collection server 11 and the performance management server 12.

In FIG. 1A, the performance management system 10 is composed of the three different information processing apparatuses, namely, the information collection server 11, the performance management server 12, and the management client 13. However, the hardware configuration of the performance management system 10 is not limited to this configuration. For example, it is also possible to realize the performance management system 10 by using a single information processing apparatus.

Figure 1B:
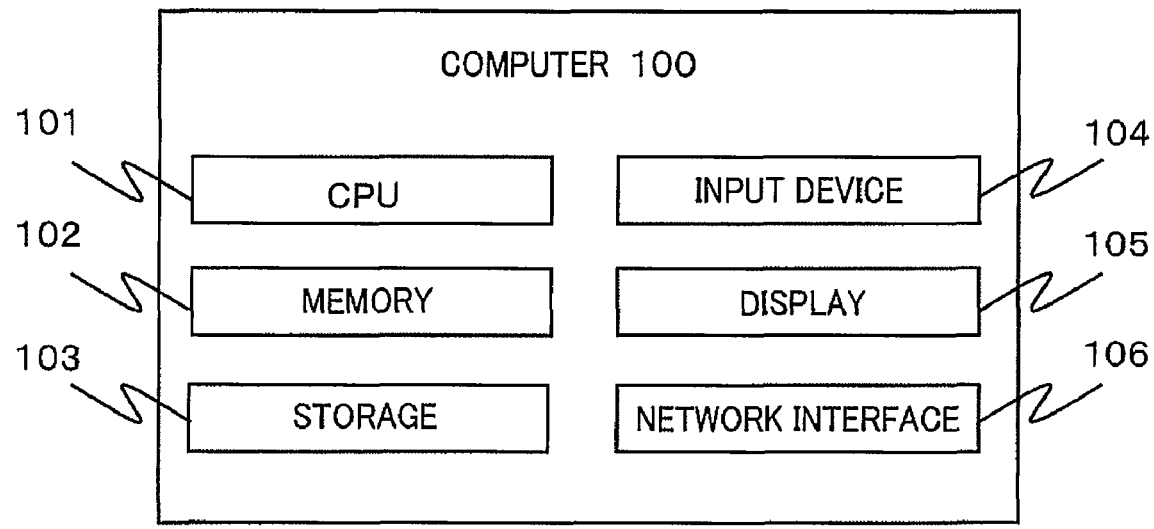
FIG. 1B is a diagram showing an example of a hardware configuration of a computer 100 (an information processing apparatus) which can be used as a service server 2, a service client 6, an information collection server 11, a performance management server 12, and a management client 13.

FIG. 1B shows an example of a hardware configuration of a computer 100 (an information processing apparatus) which can be used as the service server 2, the service client 6, the information collection server 11, the performance management server 12, and the management client 13. As shown in FIG. 1B, this computer 100 includes a CPU 101, a memory 102 (a random access memory (RAM) or a read only memory (ROM)), a storage 103 (such as a hard disk or a semiconductor storage device (a solid-state device or SSD), an input device 104 (such as a keyboard or a mouse) for receiving input from the user, a display 105 (such as a liquid crystal monitor or a cathode-ray tube display), and a network interface 106 (such as a network interface card (NIC) or a host bus adapter (HBA)) for communicating with another apparatuses.

Figure 1C:
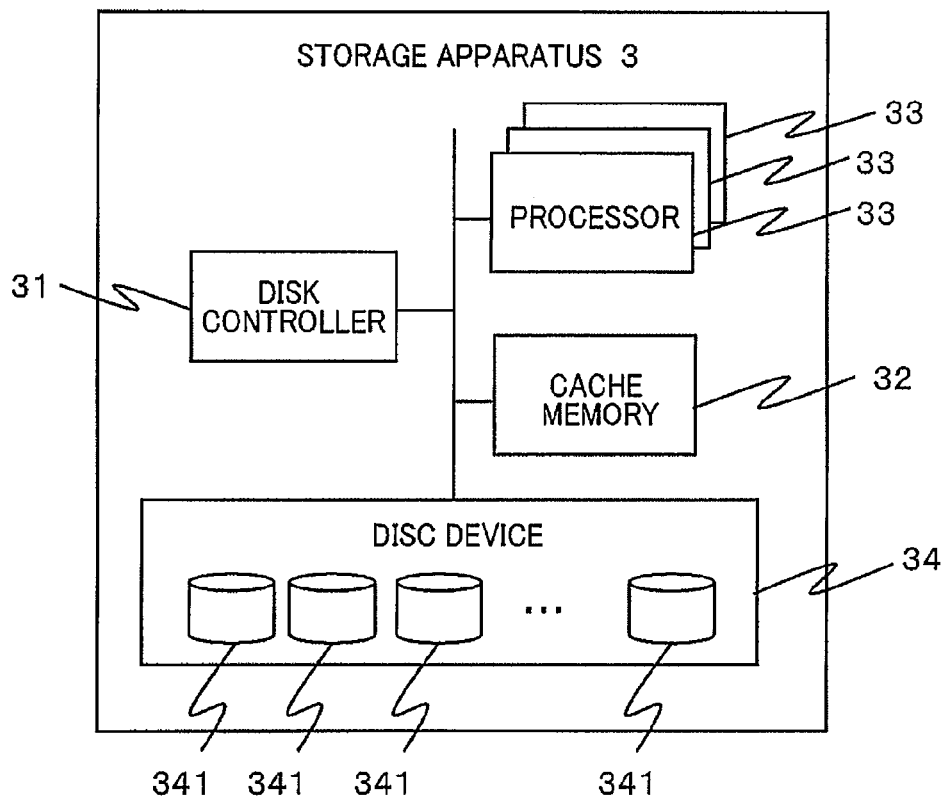
FIG. 1C is a diagram showing an example of a hardware configuration of a storage apparatus 3.

FIG. 1C shows an example of a hardware configuration of the storage apparatus 3. As shown in FIG. 1C, the storage apparatus 3 includes a disk controller 31, a cache memory 32, at least one processor 33, and a disk device 34. The processor 33 communicates with the service server 2 through the switch 4. The disk controller 31 includes a CPU and a memory. The disk controller 31 performs various processes for implementing functions of the storage apparatus 3. The disk device 34 includes at least one hard disk 341 (a physical disk) serving as a data storage medium. The cache memory 32 stores therein, for example, data to be written into or readout from the disk device 34. An example of the storage apparatus 3 including the above-described configuration is a disk array apparatus including multiple hard disk devices to be controlled by a Redundant Arrays of Inexpensive (or Independent) Disks (RAID).

Figure 1D:
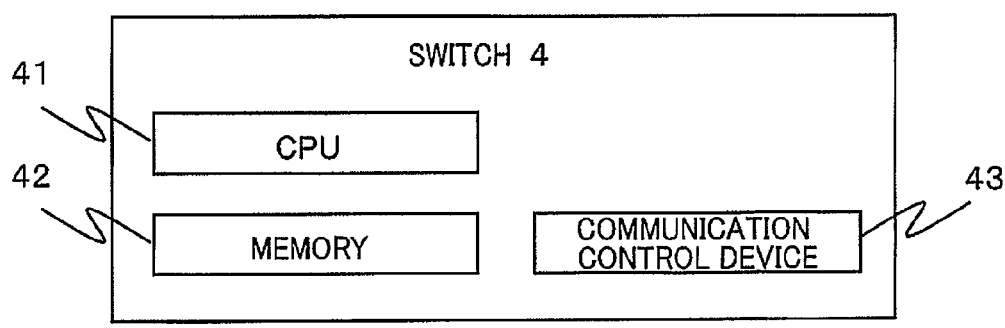
FIG. 1D is a diagram showing an example of a hardware configuration of a switch 4.

FIG. 1D shows an example of a hardware configuration of the switch 4. This switch 4 includes a CPU 41, a memory 42, and a communication control device 43. The CPU 41 implements, for example, a function of managing a correlation between the communication port 431 of the switch 4 and a network address, a filtering function, and a security function. The memory 42 is a RAM, a ROM or a non-volatile memory (such as a flash memory), for example. The memory 42 stores therein, for example, programs for implementing the functions described above, various tables of network addresses, port numbers and the like for managing correlations between senders and destinations, and setting information on the filtering function and the security function. The communication control device 43 is a switch controller, for example, and performs transfer control on frames and packets to be inputted and outputted to and from the respective communication ports 431 on the basis of sender information and destination information of the frames and the packets.

(Description of Functions)

Figure 2:
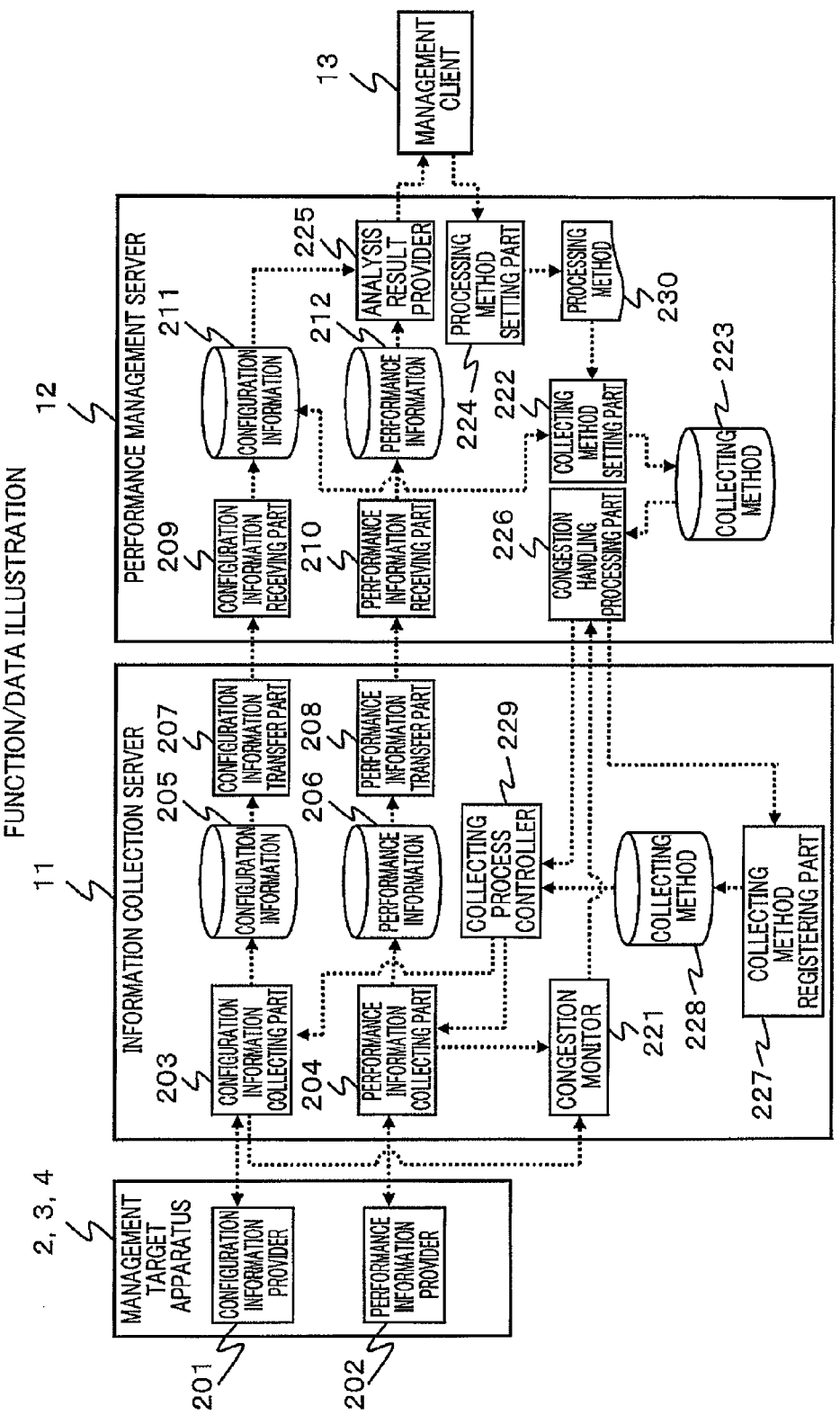
FIG. 2 is a diagram showing principal functions of a management target apparatus, the information collection server 11, and the performance management server 12 as well as principal data to be managed by these apparatuses.

FIG. 2 shows principal functions of the information collection server 11 and the performance management server 12, as well as the service server 2, the storage apparatus 3 and the switch 4 (they will be hereinafter also referred to as management target apparatuses) to be subjected to monitoring and control of the configuration and the performance thereof, and it also shows principal data to be managed by the information collection server 11 and the performance management server 12.

As shown in FIG. 2, each of the management target apparatuses (the service server 2, the storage apparatus 3, and the switch 4) includes a configuration information provider 201 and a performance information provider 202. Note that these functions are implemented by causing the CPU of the management target apparatus to execute programs stored in the memory of the management target apparatus.

As shown in FIG. 2, the information collection server 11 includes a configuration information collecting part 203 and a performance information collecting part 204. Note that these functions are implemented by causing the CPU 101 of the information collection server 11 to execute programs stored in the memory 102 of the information collection server 11.

The configuration information provider 201 provides (transmits) configuration information of the management target apparatus to the configuration information collecting part 203 of the information collection server 11. The performance information provider 202 provides (transmits) performance information of the management target apparatus to the performance information collecting part 204 of the information collection server 11.

The configuration information includes, for example, information on a correlation between a service application operated on the service server 2 and a file or a directory to be accessed by the service application, a correlation between a file and a volume (a management unit of a data storage area in the service server 2), a correlation among a volume, a logical device (LDEV, a storage), the communication port 231 of the service server 2 and the port 331 of the storage apparatus 3, a correlation between the port 331 of the storage apparatus 3 and the processor 33 of the storage apparatus 3, a correlation between the processor 33 and a RAID group, and a correlation between the RAID group and the LDEV.

The performance information includes, for example, the number of I/O requests per unit time to be issued to each file or directory, the number of data pieces (packets or frames) per unit time sent to each of the communication ports 231, 331, and 431, the number of I/O requests per unit time to be issued to each RAID group, and the number of I/O requests per unit time to be issued to each LDEV.

The performance information is, for example, determined by a metrics value which is an index that quantitatively indicates a characteristic (a performance) of a resource (a hardware resource or a software resource) included in the components (the service server 2, the storage apparatus 3 or the switch 4) of the storage system 5.

Note that the collection of the configuration information to be carried out by the configuration information provider 201 and the configuration information collecting part 203, as well as the collection of the performance information to be carried out by the performance information provider 202 and the performance information collecting part 204 are performed by use of Simple Network Management Protocol (SNMP), for example. In this case, the configuration information collecting part 203 and the performance information collecting part 204 function as SNMP managers while the configuration information provider 201 and the performance information provider 202 function as SNMP agents. The collection described above may also be performed by use of Microsoft® Windows® Management Instrumentation (WMI), Web-based Enterprise Management (WBEM), Secure Shell (SSH), Storage Management Initiative-Specification (SMI-S), and the like.

The configuration information collecting part 203 of the information collection server 11 stores the received configuration information in a configuration information database 205 of the information collection server 11. The performance information collecting part 204 of the information collection server 11 stores the received performance information in a performance information database 206 of the information collection server 11.

A configuration information transfer part 207 of the information collection server 11 provides (transmits) contents of the configuration information database 205 to a configuration information receiving part 209 of the performance management server 12 as appropriate. A performance information transfer part 208 of the information collection server 11 provides (transmits) contents of the performance information database 206 to a performance information receiving part 210 of the performance management server 12 as appropriate.

The configuration information receiving part 209 of the performance management server 12 stores the received configuration information in a configuration information database 211 of the performance management server 12. The performance information receiving part 210 of the performance management server 12 stores the received performance information in a performance information database 212 of the performance management server 12.

Accordingly, the contents of the configuration information database 205 of the information collection server 11 are synchronized with the contents of the configuration information database 211 of the performance management server 12. Meanwhile, the contents of the performance information database 206 of the information collection server 11 are synchronized with the contents of the performance information database 212 of the performance management server 12.

Figure 3:
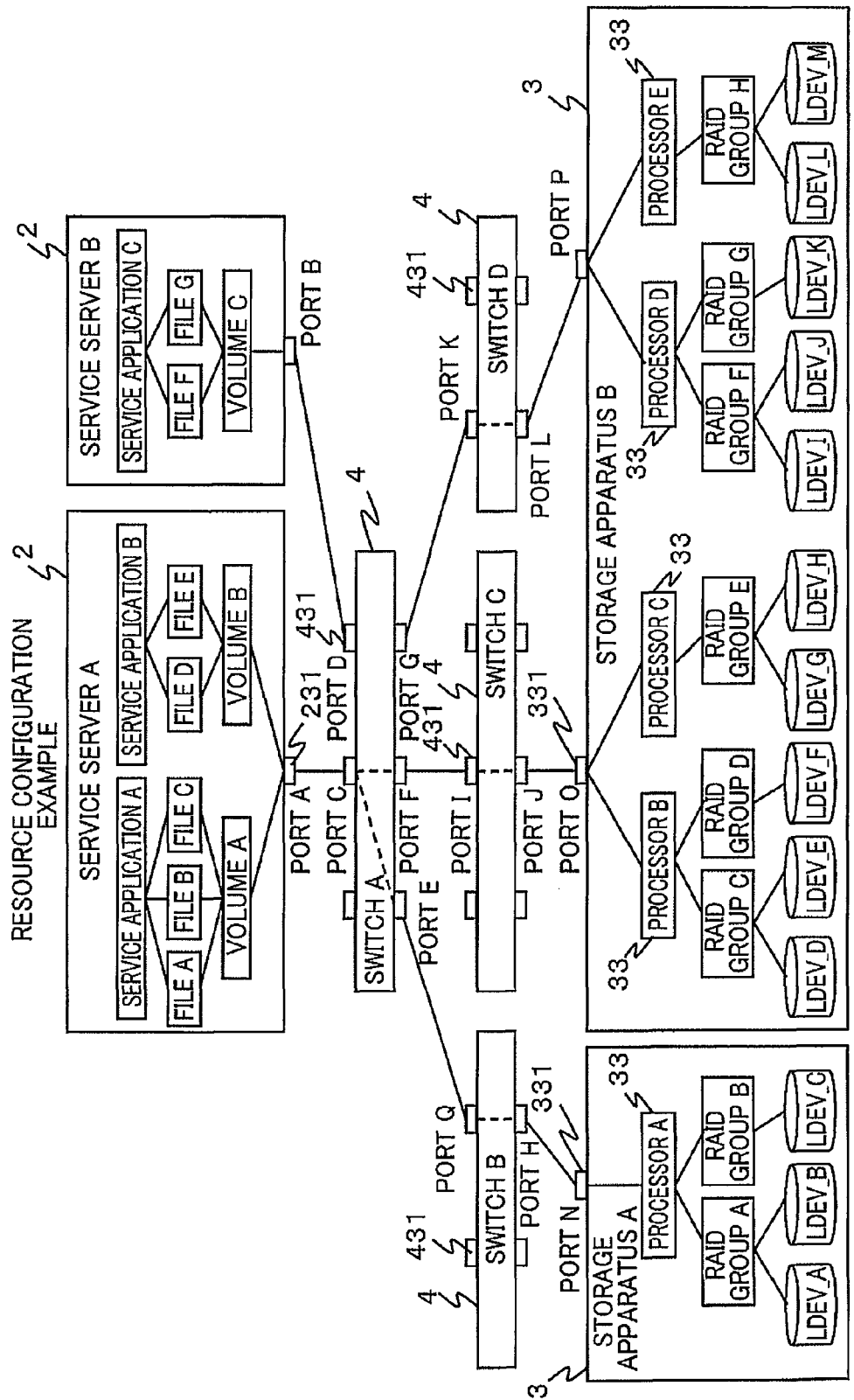
FIG. 3 is a diagram showing an example of a resource configuration of a storage system 5.

FIG. 3 shows an example of a resource configuration (resource dependency relations) of the storage system 5. As shown in FIG. 3, this storage system 5 includes resources such as service applications, files to be used (accessed) by the service applications, volumes for storing therein data to be used (accessed) by the service applications, the communication ports 231 of the application servers 2, the communication ports 431 of the switches 4, the communication ports 331 of the storage apparatuses 3, the processors 33 included in the storage apparatuses 3, the RAID groups to be controlled by the processors 33, the LDEVs (logical devices) forming the RAID groups, and so forth.

As shown in FIG. 3, the storage systems 5 includes the two service servers 2 (A, B), the four switches 4 (A, B, C, D) coupled in a cascade fashion, and the two storage apparatuses 3 (A, B) Two service applications A and B are operated on the service server 2 (A), and the service server 2 (A) includes files A, B, and C used (accessed) by the service application A, files D and E used by the service application B, a volume A for storing therein data of the service application A, and a volume B for storing therein data of the service application B. Moreover, the service server 2 (A) includes the single communication port 231 (A) shared by the two service applications A and B.

A service application C is operated on the service server 2 (B), and the service server 2 (B) includes files F and G used by the service application C and a volume C in which data pieces of the service application C are managed. Moreover, the service server 2 (B) includes the single communication port 231 (B).

The switch 4 (A) includes the multiple communication ports 431 (C, D, E, F, G). The switch 4 (B) includes the multiple communication ports 431 (Q, H). The switch 4 (C) includes the multiple communication ports (I, J). The switch 4 (D) includes the multiple communication ports 431 (K, L).

The storage apparatus 3 (A) includes the processor 33 (A), RAID groups A and B controlled by the processor 33 (A), LDEVs (A, B) forming the RAID group A, and an LDEV (C) forming the RAID group B. Moreover, the storage apparatus 3 (A) includes the communication port 331 (N).

The storage apparatus 3 (B) includes the processors 33 (B, C, D, E), RAID groups C and D controlled by the processor 33 (B), LDEVs (D, E) forming the RAID group C, an LDEV (F) forming the RAID group D, a RAID group E controlled by the processor 33 (C), LDEVs (G, H) forming the RAID group E, RAID groups F and G controlled by the processor 33 (D), LDEVs (I, J) forming the RAID group F, an LDEV (K) forming the RAID group G, a RAID group H controlled by the processor 33 (E), and LDEVs (L, M) forming the RAID group H. Moreover, the storage apparatus 3 (B) includes the multiple communication ports 331 (O, P).

Figure 4:
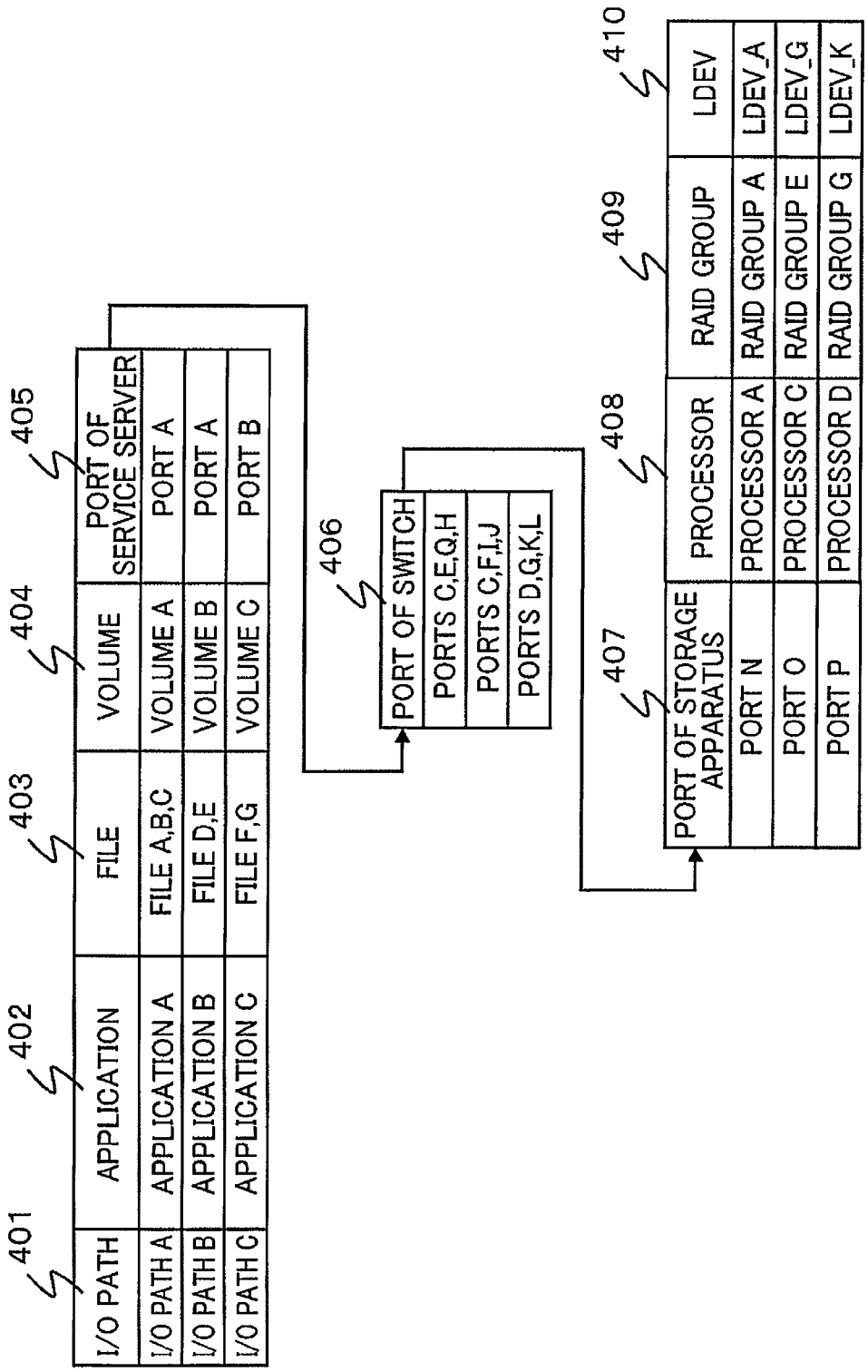
FIG. 4 is a table showing an example of a configuration information table 400.

FIG. 4 shows an example of a table (hereinafter referred to as a configuration information table 400) to be stored in the configuration information databases 205 and 211. As shown in FIG. 4, this configuration information table 400 stores therein relations among the resources of the storage system 5, namely, an I/O path 401, an application 402, a file 403, a volume 404, a communication port (231) 405 of the service server 2, a communication port (431) 406 of the switch 4, a communication port (331) 407 of the storage apparatus 3, a processor (33) 408 of the storage apparatus 3, a RAID group 409, and an LDEV 410.

For example, a record on a second row of the configuration information table 400 shown in FIG. 4 indicates that the service application (A) uses the files (A, B, C), the volume (A), the port 231 (A) of the service server 2, the ports 431 (C, E, Q, H) of the switch 4, the port 331 (N) of the storage apparatus 3, the processor (A) of the storage apparatus 3, the RAID group (A), and the LDEV (A) (an I/O path formed by these resources will be hereinafter referred to as an I/O path (A)).

Meanwhile, a record on a third row of the configuration information table 400 shown in FIG. 4 indicates that the service application (B) uses the files (D, E), the volume (B), the port 231 (A) of the service server 2, the ports 431 (C, F, I, J) of the switch 4, the port 331 (O) of the storage apparatus 3, the processor (C) of the storage apparatus 3, the RAID group (E), and the LDEV (G) (an I/O path formed by these resources will be hereinafter referred to as an I/O path (B)).

Meanwhile, a record on a fourth row of the configuration information table 400 shown in FIG. 4 indicates that the service application (C) uses the files (F, G), the volume (C), the port 231 (B) of the service server 2, the ports 431 (D, G, K, L) of the switch 4, the port 331 (P) of the storage apparatus 3, the processor (D) of the storage apparatus 3, the RAID group (G), and the LDEV (K) (an I/O path formed by these resources will be hereinafter referred to as an I/O path (C)).

FIG. 5 shows an example of a table (hereinafter referred to as a performance information table 500) to be stored in the performance information databases 206 and 212. As shown in FIG. 5, the performance information table 500 includes at least one record having items of a date and time of acquisition 501, a resource name 502, and a metrics value 503. In the date and time of acquisition 501, date and time of acquisition of the performance information is stored. In the resource name 502, information specifying a resource from which the performance information is acquired is stored. In the metrics value 503, the performance information expressed by using a metrics value is stored. The metrics value is, for example, the value indicating an amount of I/O flowing to and from the resource.

A congestion monitor 221 of the information collection server 11 shown in FIG. 2 monitors in real time loads of I/O executed by the configuration information collecting part 203 and the performance information collecting part 204, and judges whether or not there is congestion attributable to the I/O processed by the configuration information collecting part 203 or the performance information collecting part 204, i.e. congestion (a bottleneck) attributable to I/O (inputs and outputs of data pieces and commands) processed between the performance management system and resources for collecting management information.

The congestion monitor 221 notifies a congestion handling processing part 226 in the performance management server 12 of a result of the judgment. Specifically, the congestion monitor 221 judges that I/O congestion has occurred when the load exceeds a predetermined threshold, for example, and notifies a collecting method setting part 222 in the performance management server 12 of the occurrence of congestion.

The congestion monitor 221 grasps the load by acquiring information such as: the metrics value as mentioned above; a data amount per unit time of the configuration information or the performance information collected by the configuration information collecting part 203 or the performance information collecting part 204; response time for a request transmitted from either the configuration information collecting part 203 or the performance information collecting part 204 to either the configuration information provider 201 or the performance information provider 202 respectively; and the number of queuing of the request.

The collecting method setting part 222 of the performance management server 12 sets a method of collecting the configuration information or the performance information to be carried out by the configuration information collecting part 203 or the performance information collecting part 204, and stores the collecting method thus set in a collecting method database 223. Moreover, the collecting method setting part 222 notifies a collecting method registering part 227 in the information collection server 11 of the fact of having updated the collecting method database 223. Note that the setting of the method of collecting the configuration information or the performance information (hereinafter also abbreviated as the collecting method) means setting of timing (a collection schedule) to collect the configuration information or the performance information (hereinafter also abbreviated as the collection timing), for example. The collecting method setting part 222 sets, depending on a state of congestion notified by the congestion monitor 221, the collecting method to be carried out by the configuration information collecting part 203 or the performance information collecting part 204. Specifically, the collecting method setting part 222 sets the collecting method to be carried out by the configuration information collecting part 203 or the performance information collecting part 204 in accordance with any of processing methods to be described later.

Note that as shown in FIG. 2, the processing method is set by a processing method setting part 224 in response to an instruction from the management client 13. The user, operator or the like determines a processing method 230 based on an analysis result provided by an analysis result provider 225 and presented by the management client 13, and performs operations for giving the instruction thus determined to the processing method setting part 224.

When receiving the notification of occurrence of congestion from the congestion monitor 221, the congestion handling processing part 226 instructs a collecting process controller 229 of the information collection server 11 to adjust the collection timing, and transmits the current collecting method stored in the collecting method database 223 to the collecting method registering part 227 of the information collection server 11.

The collecting method registering part 227 stores the collecting method transmitted from the congestion handling processing part 226 in a collecting method database 228 of the information collection server 11.

Upon receipt of the instruction for adjusting the collection timing from the congestion handling processing part 226 of the performance management server 12, the collecting process controller 229 of the information collection server 11 sets the timing to collect the configuration information or the performance information to be executed by the configuration information collecting part 203 or the performance information collecting part 204 depending on the collecting method stored in the collecting method database 228 by the collecting method registering part 227.

(Processing Method)

Next, the above-mentioned processing methods will be described. The user or the operator can select any of the following four processing methods, namely, first to fourth processing methods, as the collecting method to be executed by the configuration information collecting part 203 or the performance information collecting part 204.

(1) First Processing Method

The first processing method is a method of setting the collecting method of the configuration information or the performance information (hereinafter collectively referred to as the management information) so as to use different timings, for the respective applications, to collect the management information of resources on the I/O paths of the corresponding application when congestion (congestion of I/O processed by the configuration information collecting part 203 or the performance information collecting part 204) occurs in the information collection server 11 at the time of collecting the management information of the resources on the I/O paths of the multiple applications operating on the service server 2.

When resources in the storage system 5 have configurations shown in FIG. 4, for example, the collecting method setting part 222 sets the collection timings of the management information of the resources on the I/O path A, the I/O path B, and the I/O path C to 10 seconds, 60 seconds, and 120 seconds after the occurrence of congestion, respectively, as shown in FIG. 6. Then, the collecting method setting part 222 stores the contents shown in FIG. 6 in the collecting method database 223. Note that the collection timing for the I/O path A is set to 10 seconds later instead of now (0 second later) in this example, in order to reduce the existing congestion as much as possible.

According to the first processing method, the collection timings of the management information are set different from each other. Thus, it is possible to reduce the load on the information collection server 11 at a certain instant and thereby to reduce or eliminate the congestion of the information collection server 11.

(2) Second Processing Method

The second processing method is based on the first processing method. When collecting the management information of a resource on an I/O path of a first application, there may be a case where the resource on the I/O path is also a component of an I/O path of a second application, i.e., a case where the resource used by the first application is also used by the second application (hereinafter referred to as a shared resource). In such cases, the second processing method is a method of setting, in the case described above, the collecting method so as to collect the management information of the second application that uses the shared resource at the same timing of collecting the management information of the resource on the I/O path of the first application.

When the resources in the storage system 5 have the configurations shown in FIG. 4, for example, the collecting timings of the management information are set as shown in FIG. 6, according to the first processing method. However, since the port A and the port C are shared resources, the collecting method setting part 222 also collects the management information of the I/O path B at the timing of collecting the management information of the I/O path A, while it collects the management information of the I/O path A at the timing of collecting the management information of the I/O path B. Therefore, in this case, in addition to the collection timing indicated in FIG. 6, the management information of the I/O path A and the I/O path B is collected at the collection timing indicated in FIG. 7. Thus, the collecting method setting part 222 stores the contents shown in FIG. 7 in the collecting method database 223 in addition to the contents shown in FIG. 6.

According to the second processing method, the management information of the resource used by the second application that uses the shared resource is also collected when collecting the management information of the resource used by the first application. Therefore, when the I/O for acquiring the management information from the shared resource is a cause of congestion in the information collection server 11, for example, it is possible to grasp an influence by the second application at the same time and thereby to grasp the cause of congestion in detail.

(3) Third Processing Method

The third processing method is, when collecting the management information of resources on an I/O path, a method of setting the collecting method so as to use different timings of collecting the management information for respective groups of applications using a shared resource on the I/O path.

When the resources in the storage system 5 have the configurations shown in FIG. 4, for example, the port A and the port C are the shared resources used by the application A and the application B. Accordingly, the collecting method setting part 222 sets the collection timing of the management information of the I/O path A and that of the I/O path B to be identical to each other and to be different from the collection timing of the management information of the I/O path C. Therefore, in this case, the collecting method setting part 222 sets the collecting method so as to collect the management information of the I/O path A, the I/O path B and the I/O path C at collection timings shown in FIG. 8, and stores the contents shown in FIG. 8 in the collecting method database 223.

According to the third processing method, the management information of the group of applications using the shared resource is collected at the same timing. Therefore, when the I/O for acquiring the management information from the shared resource is the cause of congestion in the information collection server 11, for example, it is possible to grasp an influence by other applications that belong to the same group of applications at the same time and thereby to grasp the cause of congestion in detail.

(4) Fourth Processing Method

The fourth processing method is a method of setting the collecting method so as to set timings of collecting the management information of applications in such a way that later collection timing is used for an application using more resources on its I/O path.

When the resources in the storage system 5 have the configurations shown in FIG. 4, for example, the number of resources on the I/O path A is 14, while the number of resources on the I/O path B is 13, and the number of resources on the I/O path C is 13. Therefore, the collecting method setting part 222 sets the collecting method so as to execute the collection of the management information of the I/O path having the largest number of resources, i.e. the I/O path A, in the last place, and stores the contents shown in FIG. 9 in the collecting method database 223. Note that the I/O path B and the I/O path C have the same number of resources. In such case of the same number of resources, the collecting method setting part 222 determines the collection timing in accordance with, for example a preset order of priority.

In general, the more the number of resources is, the larger the amount of the management information becomes. Therefore, by setting later timing of collecting the management information for the application using more resources, it is possible to reduce or eliminate the congestion occurring at the present time.

(Explanations of Processes)

Next, principal processes to be executed in the information processing system 1 will be described. In the following description, a character "S" put in front of reference numerals stands for a step.

Figure 10:
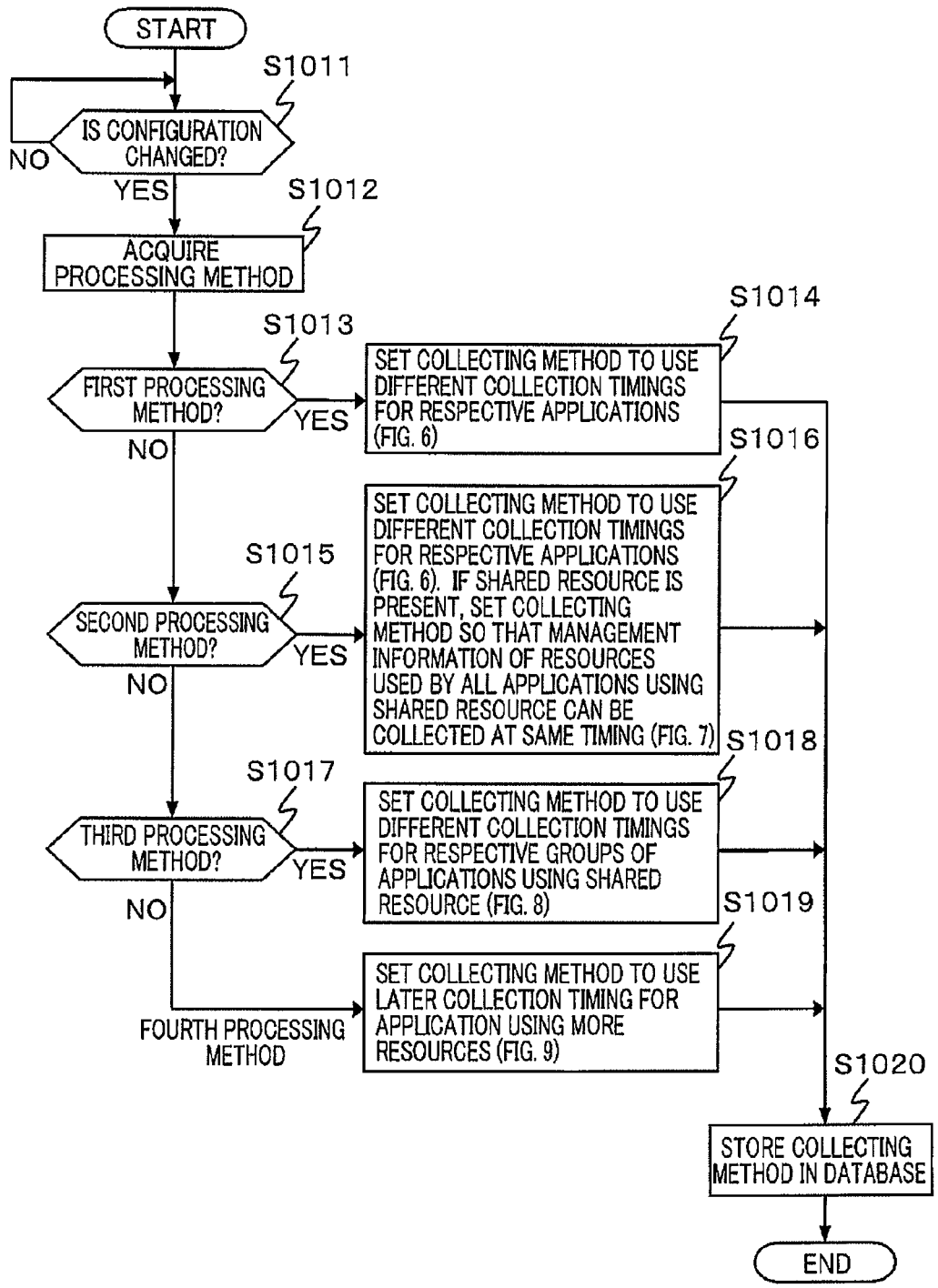
FIG. 10 is a flowchart for explaining a collecting method setting process S1000.

FIG. 10 is a flowchart showing a process (hereinafter referred to as a collecting method setting process S1000) to be executed by the collecting method setting part 222 of the performance management server 12. Now, the collecting method setting process S1000 will be described below with reference to FIG. 10.

The collecting method setting part 222 checks in real time the processing method 230 currently set by the processing method setting part 224 (S1011: NO). If a change in the processing method 230 is identified (S1011: YES), the collecting method setting part 222 acquires the processing method 230 from the processing method setting part 224 (S1012).

Next, the collecting method setting part 222 sets the collecting method in accordance with the processing method 230

(S1013 to S1019) and stores the collecting method thus set in the collecting method database 223 (S1020).

For example, if the processing method 230 set by the processing method setting part 224 is the first processing method (S1013: YES), the collecting method setting part 222 sets the collecting method to use different timings of collecting management information for the respective applications. When the resources in the storage system 5 have the configurations shown in FIG. 4, for example, the collecting method setting part 222 sets time adjustment amounts to be applied to the respective I/O paths to the contents shown in FIG. 6 (S1014). The collecting method setting part 222 stores the contents thus set in the collecting method database 223 (S1020).

Meanwhile, if the processing method 230 set by the processing method setting part 224 is the second processing method (S1015: YES), the collecting method setting part 222 sets the collecting method to use different timings of collecting management information for the respective applications. When there is any shared resource, the collecting method setting part 222 sets the collecting method so that management information of resources used by all applications using the shared resource can be collected at the same timing. When the resources in the storage system 5 have the configurations shown in FIG. 4, for example, the collecting method setting part 222 sets the time adjustment amounts to be applied to the respective I/O paths to the contents shown in FIG. 6 and FIG. 7 (S1016). The collecting method setting part 222 stores the contents thus set in the collecting method database 223 (S1020).

Meanwhile, if the processing method 230 set by the processing method setting part 224 is the third processing method (S1017: YES), the collecting method setting part 222 sets the collecting method to use different collection timings for respective groups of applications using the same shared resource. To be more precise, when the resources in the storage system 5 have the configurations shown in FIG. 4, for example, the collecting method setting part 222 sets the time adjustment amounts to be applied to the respective I/O paths to the contents shown in FIG. 8 (S1018). The collecting method setting part 222 stores the contents thus set in the collecting method database 223 (S1020).

Meanwhile, if the processing method 230 set by the processing method setting part 224 is the fourth processing method (S1017: NO), the collecting method setting part 222 sets the collecting method to use later collection timing for an application using more resources. Specifically, when the resources in the storage system 5 have the configurations shown in FIG. 4, for example, the collecting method setting part 222 sets the time adjustment amounts to be applied to the respective I/O paths to the contents shown in FIG. 9 (S1019). The collecting method setting part 222 stores the contents thus set in the collecting method database 223 (S1020).

Figure 11:
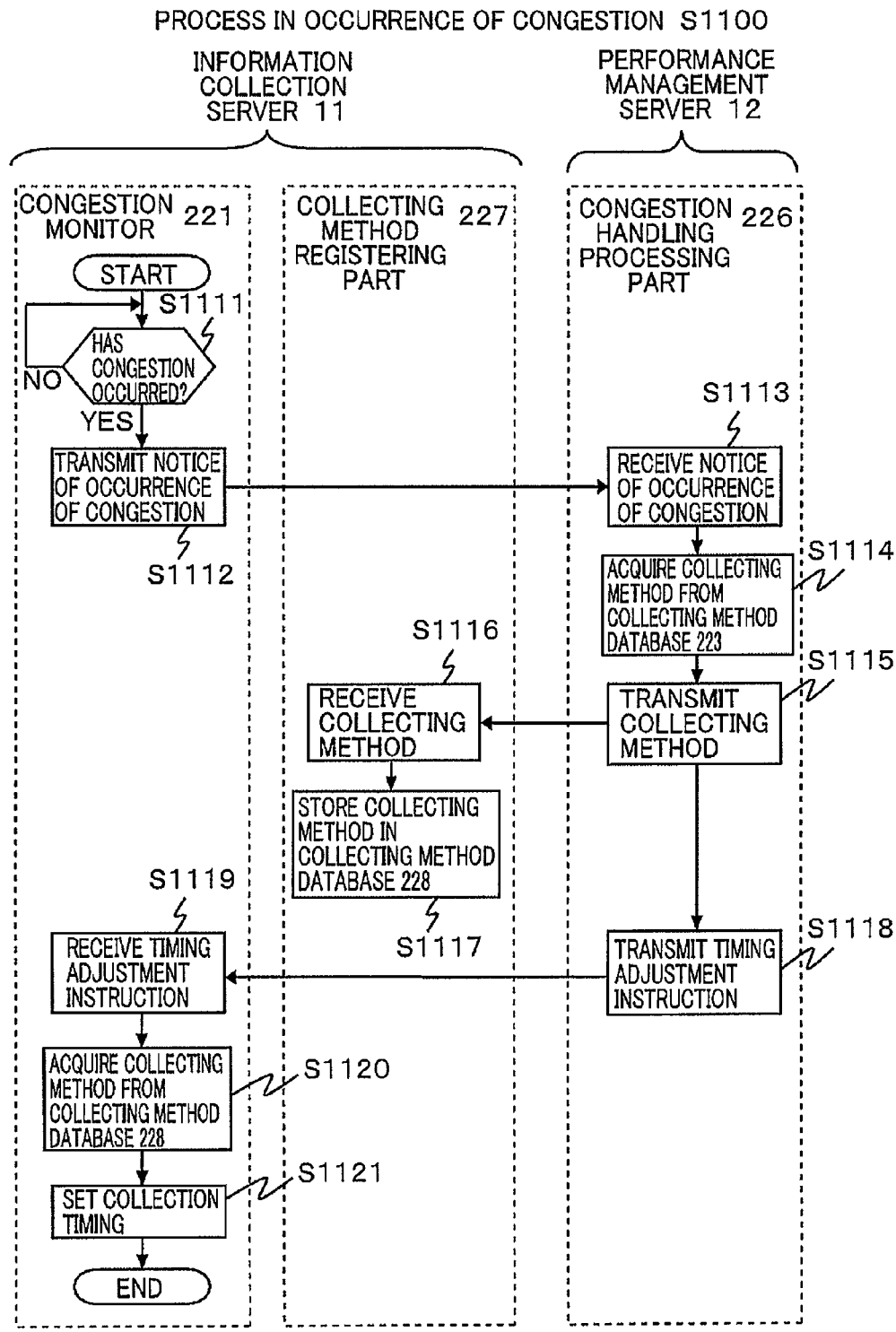
FIG. 11 is a flowchart for explaining a process in occurrence of congestion S1100.

FIG. 11 is a flowchart showing a process (hereinafter referred to as a process in occurrence of congestion S1100) to be executed by the congestion monitor 221 and the collecting method registering part 227 of the information collection server 11 and by the congestion handling processing part 226 of the performance management server 12 at the time of occurrence of congestion.

The congestion monitor 221 of the information collection server 11 monitors in real time whether or not congestion occurs due to the I/O executed by the configuration information collecting part 203 and the performance information collecting part 204 (S1111). If the occurrence of congestion S1111: YES) is detected, the congestion monitor 221 notifies the congestion handling processing part 226 of the fact that the congestion has occurred, and the congestion handling processing part 226 receives the notice (S1113).

Next, the congestion handling processing part 226 acquires the collecting method (the collecting method that corresponds to the processing method 230 currently set) from the collecting method database 223 (S1114) and transmits the acquired collecting method to the collecting method registering part 227 of the information collection server 11 (S1115). Upon receipt of the collecting method (S1116), the collecting method registering part 227 stores the received collecting method in the collecting method database 228 (S1117).

After transmitting the collecting method in S1115, the congestion handling processing part 226 of the performance management server 12 notifies the collecting process controller 229 of the information collection server 11 of an instruction to adjust the timing of collecting the configuration information or the performance information to be executed by the configuration information collecting part 203 or the performance information collecting part 204 (S1118).

Upon receipt of the adjustment instruction (S1119), the collecting process controller 229 acquires the collecting method stored in the collecting method database 228 (S1120), and sets the timing of collecting the configuration information or the performance information to be executed by the configuration information collecting part 203 or the performance information collecting part 204 in accordance with the acquired collecting method (S1121).

Figure 12:
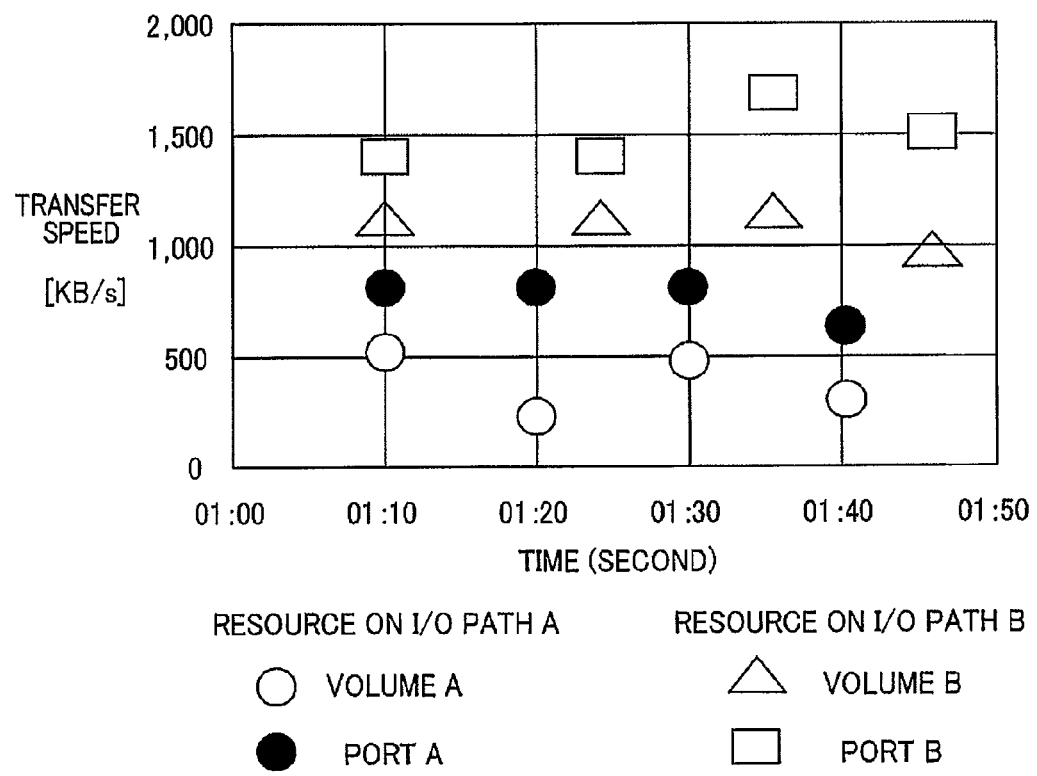
FIG. 12 is a graph showing an example of collection timing adjusted by a collecting process controller 229.

FIG. 12 shows an example of the timing of collecting the configuration information or the performance information which is adjusted by the collecting process controller 229 with the use of the above-described method.

As has been described above, according to the information processing system 1 of this embodiment, when the occurrence of congestion in the collecting process performed by the information collection server 11 is detected, the timing of collecting the configuration information or the performance information of the resources to be executed by the information collection server 11 is automatically adjusted in accordance with the collecting method corresponding to the predetermined processing method 230. Therefore, it is possible to automatically reduce or eliminate congestion in the collecting process performed by the information collecting server 11, thereby to perform collection of the configuration information or the performance information efficiently and promptly from the management target apparatus.

By the way, it is to be understood that the description of the embodiment has been made in order to facilitate understanding of the present invention but not to limit the scope of the invention. It is needless to say that the present invention encompasses various modifications, improvements, and equivalents without departing from the spirit of the present invention.

What is claimed is:

1. A performance management system for a storage system including a server on which applications operate, a storage apparatus for managing data, which is to be accessed by the server, in a storage, and a switch for communicatively coupling the server with the storage apparatus, the performance management system being communicatively coupled with the server, the storage apparatus and the switch, and collecting management information used for performance management of the storage system, the performance management system comprising:

an information collecting part which collects the management information from a plurality of resources existing on input-output paths that couple the respective applications with the storage;

a collecting method setting part which sets a method of causing the information collecting part to collect the management information from each of the resources;
a congestion monitor which monitors whether or not congestion occurs due to input-output between the performance management system and the resources for collecting the management information; and
a collecting process controller which controls the information collecting part so that the management information is collected in accordance with the method set by the collecting method setting part,
wherein the collecting method setting part sets the collecting method in accordance with a first processing method of using different timings to collect the management information for the respective input-output paths,
wherein the collecting method setting part sets the collecting method in accordance with any one of the first processing method and a second processing method in which the different timings are used to collect the management information for the respective input-output paths, and if any of the resources is shared by different input-output paths, the timing of collecting the management information of any one of the input-output paths using the shared resource is also used to collect the management information of the other input-output paths using the shared resource, and
wherein the collecting method setting part sets the collecting method in accordance with any one of the first processing method, the second processing method, and a third processing method of using different timings to collect the management information for respective groups of the applications using the shared resource.

2. The performance management system according to claim 1,
wherein the collecting method setting part sets the collecting method in accordance with any one of the first processing method, the second processing method, the third processing method, and a fourth processing method of using a timing to collect the management information for one of the input-output paths of the applications using a larger number of the resources later than the timings to collect the management information for the other input-output paths of the applications.

3. The performance management system according to claim 1,
wherein the resource is at least anyone of the application, a file to be managed by the server and used by the application, a volume which stores data to be used by the application, a communication port of the server, a communication port of the switch, a communication port of the storage apparatus, a processor included in the storage apparatus, a group of RAID to be controlled by the processor, and the storage.

4. An information processing system comprising:
a performance management system for a storage system including a server on which applications operate, a storage apparatus for managing data, which is to be accessed by the server, in a storage, and a switch for communicatively coupling the server with the storage apparatus, the performance management system being communicatively coupled with the server, the storage apparatus and the switch, and collecting management information used for performance management of the storage system;
an information collecting part which collects the management information from a plurality of resources existing on input-output paths that couple the respective applications with the storage;
a collecting method setting part which sets a method of causing the information collecting part to collect the management information from each of the resources;
a congestion monitor which monitors whether or not congestion occurs due to input-output between the performance management system and the resources for collecting the management information; and
a collecting process controller which controls the information collecting part so that the management information is collected in accordance with the method set by the collecting method setting part,
wherein the collecting method setting part sets the collecting method in accordance with a first processing method of using different timings to collect the management information for the respective input-output paths,
wherein the collecting method setting part sets the collecting method in accordance with any one of the first processing method and a second processing method in which the different timings are used to collect the management information for the respective input-output paths, and if any of the resources is shared by different input-output paths, the timing of collecting the management information of any one of the input-output paths using the shared resource is also used to collect the management information of the other input-output paths using the shared resource, and
wherein the collecting method setting part sets the collecting method in accordance with any one of the first processing method, the second processing method, and a third processing method of using different timings to collect the management information for respective groups of the applications using the shared resource.

5. The information processing system according to claim 4,
wherein the collecting method setting part sets the collecting method in accordance with any one of the first processing method, the second processing method, the third processing method, and a fourth processing method of using a timing to collect the management information for one of the input-output paths of the applications using a larger number of the resources later than the timings to collect the management information for the other input-output paths of the applications.

6. The information processing system according to claim 4,
wherein the resources is at least anyone of the application, a file to be managed by the server and used by the application, a volume which stores data to be used by the application, a communication port of the server, a communication port of the switch, a communication port of the storage apparatus, a processor included in the storage apparatus, a group of RAID to be controlled by the processor, and the storage.

7. An information collecting method in a performance management system for a storage system including a server on which applications operate, a storage apparatus for managing data, which is to be accessed by the server, in a storage, and a switch for communicatively coupling the server with the storage apparatus, the performance management system being communicatively coupled with the server, the storage apparatus and the switch, and collecting management information used for performance management of the storage system, the information collecting method executed by the performance management system comprising:

a first step of collecting the management information from a plurality of resources existing on input-output paths that couple the respective applications with the storage;

a second step of setting a method of collecting the management information from each of the resources;

a third step of monitoring whether or not congestion occurs due to input-output between the performance management system and the resources for collecting the management information;

a fourth step of controlling collection of the management information in accordance with the set method; and a fifth step of setting the collecting method in accordance with a first processing method of using different timings to collect the management information for the respective input-output paths, wherein, instead of the fifth step, the performance management system executes a sixth step of setting the collecting method in accordance with anyone of the first processing method and a second processing method in which the different timings are used to collect the management information for the respective input-output paths, and if any of the resources is shared by different input-output paths, the timing of collecting the management information of any one of the input-output paths using the shared resource is also used to collect the management information of the other input-output paths using the shared resource, and wherein, instead of the sixth step, the performance management system executes a seventh step of setting the collecting method in accordance with any one of the first processing method, the second processing method, and a third processing method of using different timings to collect the management information for respective groups of the applications using the shared resource.

8. The information collecting method according to claim 7, wherein, instead of the seventh step, the performance management system executes an eighth step of setting the collecting method in accordance with any one of the first processing method, the second processing method, the third processing method, and a fourth processing method of using a timing to collect the management information for one of the input-output paths of the applications using a larger number of the resources later than the timings to collect the management information for the other input-output paths of the applications.

9. The information collecting method according to claim 7, wherein the resource is at least anyone of the application, a file to be managed by the server and used by the application, a volume which stores data to be used by the application, a communication port of the server, a communication port of the switch, a communication port of the storage apparatus, a processor included in the storage apparatus, a group of RAID to be controlled by the processor, and the storage.

* * * * *